(12) United States Patent
Liu et al.

(10) Patent No.: US 9,118,238 B2
(45) Date of Patent: Aug. 25, 2015

(54) CHARGE PUMP SYSTEMS WITH ADJUSTABLE FREQUENCY CONTROL

(75) Inventors: Quanwang Liu, Chengdu (CN); Guo Xing Li, Sunnyvale, CA (US); Shiqiang Liu, Shenzhen (CN)

(73) Assignee: O2Micro, Inc., Santa Clara, CA (US)

( * ) Notice: Subject to any disclaimer, the term of this patent is extended or adjusted under 35 U.S.C. 154(b) by 553 days.

(21) Appl. No.: 12/313,114

(22) Filed: Nov. 17, 2008

(65) Prior Publication Data

US 2009/0128212 A1 May 21, 2009

Related U.S. Application Data

(60) Provisional application No. 61/003,998, filed on Nov. 21, 2007.

(51) Int. Cl.
*G05F 1/10* (2006.01)
*H02M 3/07* (2006.01)

(52) U.S. Cl.
CPC ..................................... *H02M 3/07* (2013.01)

(58) Field of Classification Search
CPC ........ H02M 3/07; H02M 3/073; G11C 5/145; G11C 16/30; H01J 2924/00
See application file for complete search history.

(56) References Cited

U.S. PATENT DOCUMENTS

| | | | |
|---|---|---|---|
| 5,638,010 A * | 6/1997 | Adams | 327/105 |
| 5,978,283 A | 11/1999 | Hsu et al. | |
| 6,053,405 A * | 4/2000 | Irwin et al. | 235/375 |
| 6,212,107 B1 * | 4/2001 | Tsukada | 365/189.09 |
| 6,486,728 B2 * | 11/2002 | Kleveland | 327/536 |
| 6,570,520 B2 * | 5/2003 | Ishii | 341/144 |
| 6,980,047 B1 | 12/2005 | Kuo | |
| 7,023,259 B1 * | 4/2006 | Daniell et al. | 327/536 |
| 7,095,287 B2 * | 8/2006 | Maxim et al. | 331/44 |
| 7,248,078 B2 | 7/2007 | Mitsuda | |

* cited by examiner

*Primary Examiner* — Sibin Chen

(57) ABSTRACT

An electronic system includes a charge pump driver for generating an output to control an electronic element. The electronic system further includes a clock generator coupled to the charge pump driver. The clock generator can generate a clock signal to control the charge pump driver and adjust a frequency of the clock signal according to a status of the electronic element.

22 Claims, 9 Drawing Sheets

CHARGE PUMP SYSTEMS WITH ADJUSTABLE FREQUENCY CONTROL

RELATED APPLICATION

This application claims priority to U.S. Provisional Application No. 61/003,998, filed on Nov. 21, 2007, which is hereby incorporated by reference in its entirety.

TECHNICAL FIELD

Embodiments in accordance with the present invention relate to electronic systems with charge pumps.

BACKGROUND ART

In battery/power management applications, PMOSFETs (p-channel metal oxide semiconductor field effect transistors) can be used as high side switches for controlling charging and discharging loops. Since the PMOSFET is usually more expensive than an NMOSFET (n-channel MOSFET) with the same turn-on resistance, sometimes NMOSFETs are used as high side switches. However, if the NMOSFET is used as the high side switch in a battery management circuit, an extra charge pump is needed to drive the NMOSFET. The charge pump may generate relatively high power consumption. Thus, the system power efficiency may be reduced.

BRIEF DESCRIPTION OF THE DRAWINGS

The accompanying drawings, which are incorporated in and form a part of this specification, illustrate embodiment of the present invention and, together with the description, serve to explain the principles of the invention.

SUMMARY

In one embodiment, an electronic system includes a charge pump driver for generating an output to control an electronic element. The electronic system further includes a clock generator coupled to the charge pump driver. The clock generator can generate a clock signal to control the charge pump driver and adjust a frequency of the clock signal according to a status of the electronic element.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, an electronic system can be used to control an electronic element, e.g., a switch. A charge pump in the electronic system can generate an output to control the switch. For example, when a voltage level of the output is higher than a predetermined voltage level, the switch can be fully turned on. In addition, a clock generator, e.g., an oscillator, can generate a clock signal to drive the charge pump to turn on the switch. After the switch is fully turned on, the clock generator can automatically reduce the frequency of the clock signal, so as to reduce the switching loss of the charge pump, and at the meantime to keep the switch fully on.

Figure 1:
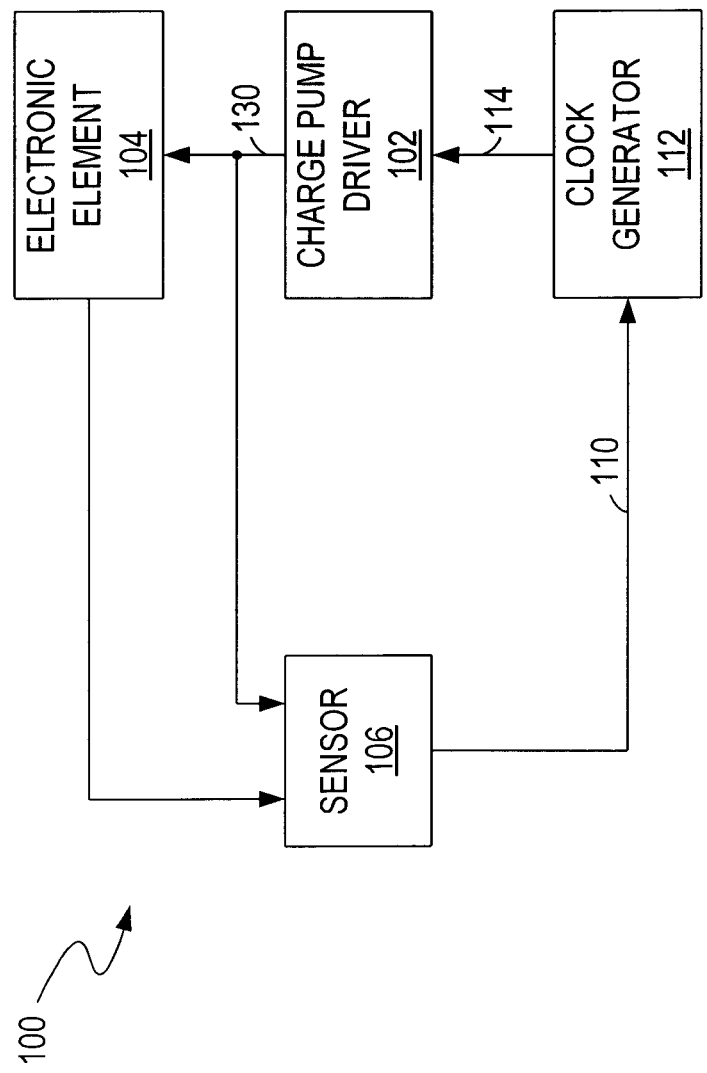
FIG. 1 depicts an exemplary block diagram of an electronic system, in accordance with one embodiment of the present invention.

FIG. 1 depicts an exemplary block diagram of an electronic system 100, in accordance with one embodiment of the present invention. As shown in FIG. 1, the electronic system 100 includes a charge pump driver 102 for generating an output 130 to control an electronic element 104. In addition, a clock generator 112 coupled to the charge pump driver 102 can generate a clock signal 114 to control the charge pump driver 102 and adjust a frequency $f_{114}$ of the clock signal 114 according to a status of the electronic element 104.

More specifically, in one embodiment, the electronic system 100 further includes a sensor 106 coupled to the electronic element 104 and for generating a control signal 110 indicative of the status of the electronic element 104. For example, the electronic element 104 can be a switch, e.g., an NMOSFET. The status of the switch 104, e.g., whether the switch 104 is fully turned on, can be indicated by a gate-source voltage $V_{GS}$ of the switch 104. The sensor 106 can monitor the gate-source voltage $V_{GS}$ of the switch 104, and generate the control signal 110 according to the gate-source voltage $V_{GS}$. In addition, the switch 104 can be turned on by the output 130 of the charge pump driver 102. A voltage level of the output 130 can be pumped up by the charge pump driver 102 based on the clock signal 114.

In one embodiment, the control signal 110 can be an analog sensing signal $V_S$ having a voltage level proportional to the gate-source voltage $V_{GS}$. In another embodiment, the control signal 110 can be a digital control signal indicative whether the switch 104 is fully turned on. For example, the sensor 106 can generate the sensing signal $V_S$ and compare the sensing signal $V_S$ with a predetermined signal $V_{PRE}$, and generate the digital control signal according to the comparison. In one such embodiment, the predetermined signal $V_{PRE}$ is determined by a fully turn-on voltage $V_F$ of the switch 104. When $V_S$ is less than $V_{PRE}$, the switch 104 is not fully turned on. When $V_S$ is greater than $V_{PRE}$, the switch 104 can be fully turned on.

Furthermore, the sensor 106 can control the clock generator 112 according to the control signal 110 indicative of the status of the switch 104, so as to adjust the frequency $f_{114}$ of the clock signal 114. For example, the frequency $f_{114}$ can have a first value $f_1$ when the switch 104 is not fully turned on. The frequency $f_{114}$ can also have a second value $f_2$ that is less than the first value $f_1$ when the switch 104 is fully turned on. The first value $f_1$ of the frequency $f_{114}$ can be, but is not limit to, higher than 500 KHz, such that the voltage level of the output 130 can be ramped up relatively quickly, so as to turn on the switch 104 relatively quickly. The second value $f_2$ can be, but is not limit to, ranged from 20 KHz to 500 KHz. As such, when the switch 104 is fully turned on, the charge pump driver 102 can be driven by the clock signal 114 with a lower frequency (e.g., from 20 KHz to 500 KHz), so as to maintain the voltage level of the output 130 to a substantially constant level and keep the switch 104 fully on. Thus, the power consumption can be reduced and the power efficiency can be increased. In one embodiment, the frequency $f_{114}$ of the clock signal 114 can be adjusted inversely proportional to the gate-source voltage $V_{GS}$ of the switch 104.

Figure 2:
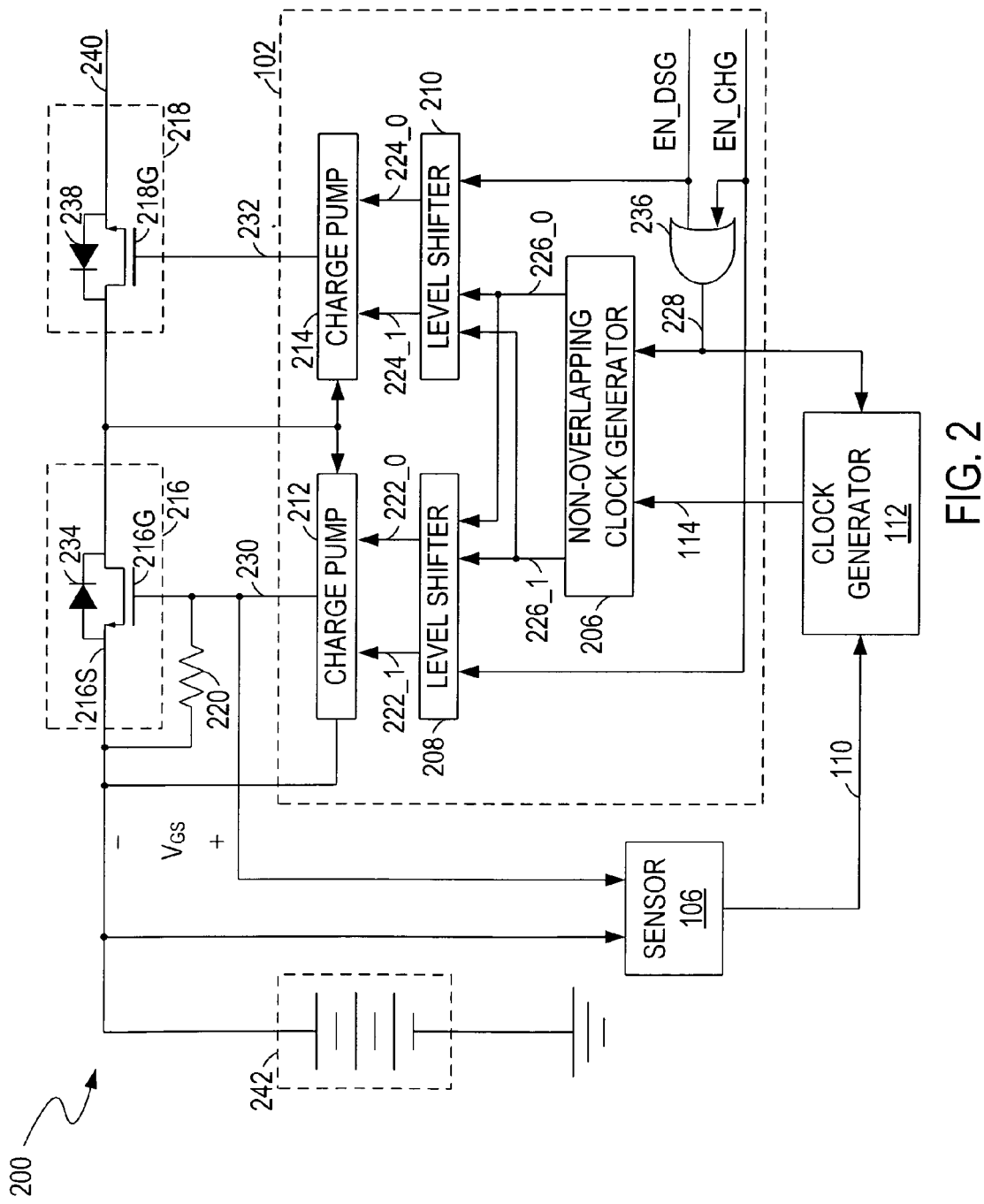
FIG. 2 depicts an exemplary block diagram of an electronic system, in accordance with one embodiment of the present invention.

FIG. 2 depicts an exemplary block diagram of an electronic system 200, in accordance with one embodiment of the present invention. Elements that are labeled the same as in FIG. 1 have similar functions and will not be repetitively described herein.

The charge pump driver 102 can be used in battery charging and discharging systems. More specifically, a control switch 216 (e.g., a charging switch) and a control switch 218 (a discharging switch) can be controlled by the charge pump driver 102 according to the control signal 110 of the sensor 106. The charging switch 216 can be, but is not limit to, an NMOSFET. The discharging switch 218 can be, but is not limit o, an NMOSFET. The sensor 106 can be coupled to a gate 216G and a source 216S of the charging switch 216 to monitor a status, e.g., a gate-source voltage $V_{GS}$, of the charging switch 216.

In one embodiment, the charging switch 216 and the discharging switch 218 can control the charging and/or discharging of a battery pack 242 according to outputs 230 and 232 of the charge pump driver 102. The battery pack 242 can be coupled to the charging switch 216. A terminal 240 of the discharging switch 218 can be coupled to a load (not shown in FIG. 2). In one embodiment, when the discharging switch 218 is turned on by the output 232 and the charging switch 216 is turned off by the output 230, the battery pack 242 can discharge power to the load via the body diode 234 of the charging switch 216 and the drain-source channel of the discharging switch 218. In an alternate embodiment, the charging switch 216 can be on during the battery discharging operation.

In another embodiment, the terminal 240 is coupled to a power source (not shown in FIG. 2). The power source can include, but is not limited to, an adapter or a universal serial bus device. In one such embodiment, when the charging switch 216 is turned on by the output 230 and the discharging switch 218 is turned off by the output 232, the battery pack 242 can be charged by the power source via the body diode 238 of the discharging switch 218 and the drain-source channel of the charging switch 216. In an alternate embodiment, the discharging switch 218 can be on during the battery charging operation.

In the example of FIG. 2, the charge pump driver 102 includes a non-overlapping clock generator 206, a charge pump 212 and a charge pump 214. The charge pumps 212 and 214 can be used to generate the outputs 230 and 232 to control the charging switch 216 and the discharging switch 218 respectively. The non-overlapping clock generator 206 can receive the clock signal 114 and generate a pair of complementary clock signals 226_1 and 226_0 for driving the charge pumps 212 and 214. In one embodiment, the charge pump driver 102 further includes a level shifter 208 and a level shifter 210. The level shifter 208 can be coupled between the non-overlapping clock generator 206 and the charge pump 212, and for converting the complementary clock signals 226_1 and 226_0 to a pair of complementary clock signals 222_1 and 222_0 having a voltage level $V_{222}$ that is higher than a voltage level $V_{226}$ of the clock signals 226_1 and 226_0. As such, the charge pump 212 can be driven by the pair of signals 222_1 and 222_0 with a higher voltage level $V_{222}$, e.g., $V_{222} > V_{226}$. Similarly, the level shifter 210 can convert the clock signals 226_1 and 226_0 to a pair of complementary clock signals 224_1 and 224_0 having a voltage level $V_{224}$ that is higher than the voltage level $V_{226}$, so as to drive the charge pump 214.

Furthermore, signals EN_CHG and EN_DSG can be used for enabling the charge pumps 212 and 214 respectively. In the example of FIG. 2, when the signal EN_CHG is enabled, the level shifter 208 can be enabled by the signal EN_CHG directly, and the OR-logic gate 236 can output a signal 228 to enable the non-overlapping clock generator 206 and the clock generator 112. As a result, the charge pump 212 can be enabled. The charge pump 214 can be enabled by the signal EN_DSG in a similar manner.

In operation, when the signal EN_CHG is disabled, the charge pump 212 can be disabled. A pull-down resistor 220 can be coupled between the gate 216G and the source 216S. When the charge pump 212 is disabled, a current flowing through the pull-down resistor 220 can decrease to zero, therefore the gate-source voltage $V_{GS}$ can decrease to zero. As such, the charging switch 216 can be turned off.

In one embodiment, at the beginning of the battery charging operation when the signal EN_CHG is enabled, the sensing signal $V_S$ is less than the predetermined signal $V_{PRE}$, such that the control signal 110 can control the clock generator 112 to generate a higher frequency clock signal 114 (e.g., higher than 500 KHz). Thus, the charge pump 212 can be driven by the clock signals 222_1 and 222_0 with the higher frequency, and a voltage level of the output 230 of the charge pump 212 can be ramped up relatively quickly. The charging switch 216 can be turned on relatively quickly. Meanwhile, the voltage level of the sensing signal $V_S$ can increase as the voltage level of the output 230 increases. When the sensing signal level $V_S$ increases to the predetermined signal level $V_{PRE}$, e.g., the charging switch 216 is fully turned on, the control signal 110 can control the clock generator 112 to generate a lower frequency clock signal 114 (e.g., range between 20 KHz and 500 KHz). Thus, the charge pump 212 can be driven by the clock signals 222_1 and 222_0 with the lower frequency, so as to maintain the voltage level of the output 230 at a substantially constant level and keep the charging switch 216 fully on.

Similarly, during a battery discharging operation, a separate sensor (not shown in FIG. 2) can be used to monitor the status of the discharging switch 218. The clock signal frequency $f_{114}$ can be adjusted according to the status of the discharging switch 218 in a similar manner as described with respect to the battery charging operation.

In one embodiment, the charging switch 216 can be the same as the discharging switch 218 and can be turned on during the battery discharging operation. In one such embodiment, the outputs 230 and 232 of the charge pumps 212 and 214 can have substantially the same voltage level. In addition, a voltage level $V_{240}$ at the terminal 240 can be lower than a voltage level $V_{216S}$ at the source 216S when one of the switches 216 and 218 is not fully turned on, and can be substantially equal to the voltage level $V_{216S}$ when both of the switches 216 and 218 are fully turned on. In other words, the gate-source voltage of the discharging switch 218 can be no less than the gate-source voltage of the charging switch 216. As such, when the charging switch 216 is fully turned on, the discharging switch 218 can be fully turned on as well. Thus, during the battery discharging operation, the frequency $f_{14}$ of the clock signal 114 for driving the discharging switch 218 can be adjusted according to the status of the charging switch 216.

Advantageously, the outputs 230 and 232 of the charge pumps 212 and 214 can be controlled by the clock signal 114 with an adjustable frequency $f_{114}$. As such, NMOSFETs with relatively low gate-source breakdown voltages can be used to further reduce the cost, in one embodiment.

Figure 3:
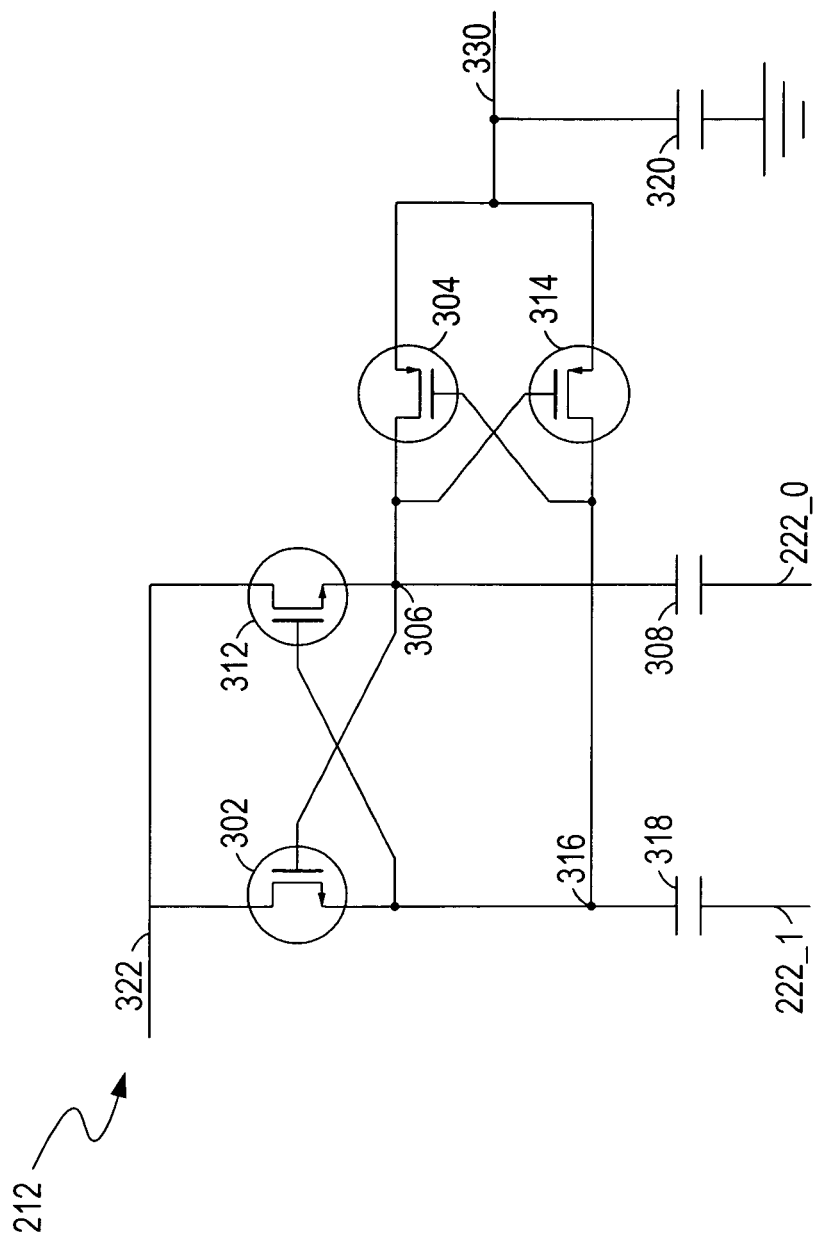
FIG. 3 depicts an exemplary circuit diagram of a charge pump, in accordance with one embodiment of the present invention.

FIG. 3 depicts an exemplary circuit diagram of a charge pump 212, in accordance with one embodiment of the present invention. Elements that are labeled the same as in FIG. 2 have similar functions and will not be repetitively described herein. FIG. 3 is described in combination with FIG. 2.

As shown in FIG. 3, the charge pump 212 includes a first switch 302, e.g., an NMOSFET, coupled between a terminal 316 of a capacitor 318 and an input terminal 322 for charging the capacitor 318. The charge pump 212 can further include a second switch 314, e.g., a PMOSFET, coupled between the terminal 316 of the capacitor 318 and an output terminal 330 for discharging the capacitor 318. In addition, the output terminal 330 can be coupled to ground via a capacitor 320 and can provide the output 230 of the charge pump driver 102. The first and second switches 302 and 314 can be respectively controlled by the clock signals 222_1 and 222_0 which are generated according to the clock signal 114.

The charge pump 212 can also include a third switch 312, e.g., an NMOSFET, coupled between a terminal 306 of a capacitor 308 and the input terminal 322 for charging the capacitor 308. The charge pump 212 can further include a fourth switch 304, e.g., a PMOSFET, coupled between the terminal 306 of the capacitor 308 and the output terminal 330 for discharging the capacitor 308.

More specifically, the drain of switch 314, and the gates of switches 304 and 312 can be coupled to the terminal 316. The drain of switch 304, and the gates of switches 314 and 302 can be coupled to the terminal 306. When a voltage level $V_{306}$ at the terminal 306 is higher than a voltage level $V_{316}$ at the terminal 316, and a voltage difference between the levels $V_{306}$ and $V_{316}$ is greater than both of the threshold voltages of switches 302 and 304, the switches 302 and 304 can be turned on. Meanwhile, the switches 312 and 314 can be turned off. As such, the capacitor 318 can be charged by a power source (not shown in FIG. 3) at the terminal 322 via the switch 302, and the capacitor 308 can discharge power to the capacitor 320 via the switch 304. Similarly, when the voltage level $V_{306}$ is lower than the voltage level $V_{316}$, and the voltage difference between the levels $V_{306}$ and $V_{316}$ is greater than both of the threshold voltages of switches 312 and 314, the switches 312 and 314 can be turned on, and meanwhile the switches 302 and 304 can be turned off. As such, the capacitor 308 can be charged by the power source at the terminal 322 via the switch 312, and the capacitor 318 can discharge power to the capacitor 320 via the switch 314.

In one embodiment, in operation, when both clock signals 222_1 and 222_0 are at a low voltage level, e.g., 0V, the voltage levels $V_{306}$ and $V_{316}$ can be ranged from 0V to a voltage level $V_{322}$ at the input terminal 322. In one embodiment, when the clock signal 222_1 is low, e.g., at 0V, and the clock signal 222_0 is high, e.g., at a voltage level $V_H$ that is higher than both of the threshold voltages of switches 302 and 304, the voltage $V_{306}$ at the terminal 306 can be increased by $V_H$. In other words, the level $V_{306}$ can be higher than the level $V_{316}$, and the voltage difference between the levels $V_{306}$ and $V_{316}$ can be greater than the threshold voltages of switches 302 and 304. As such, the switches 302 and 304 can be turned on and the switches 312 and 314 can be turned off, such that the capacitor 320 can be charged by the capacitor 308 and the capacitor 318 can be charged by the power source at the terminal 322. Similarly, when the clock signal 222_1 is high, e.g., at the level $V_H$, and the clock signal 222_0 is low, e.g., at 0V, the capacitor 320 can be charged by the capacitor 318 and the capacitor 308 can be charged by the power source at the terminal 322.

Advantageously, the clock signals 222_1 and 222_0 can be a pair of complementary clock signals provided by the non-overlapping clock generator 206 and the level shifter 208 as described for FIG. 2. As such, the capacitors 308 and 318 can be charged by the power source at the terminal 322 in an alternate fashion, and the charge stored in the capacitors 308 and 318 can be transferred to the capacitor 320 in an alternate fashion. In one embodiment, a voltage level at the output terminal 330 can increase as a frequency $f_{222}$ of the clock signals 222_1 and 222_0 increase. When the frequency $f_{222}$ reaches a certain level, the voltage level at the output terminal 330 can be substantially equal to $V_{322}$ plus $V_H$.

FIG. 3 shows an exemplary structure of the charge pump 212. The output of the charge pump in the example of FIG. 3 can have an output voltage that is equal to the input voltage $V_{322}$ plus $V_H$. However, the charge pump 212 can have other configurations. For example, by cascading the charge pump shown in FIG. 3 with another identical charge pump, e.g., by coupling the output terminal 330 to the input of the other charge pump, the charge pump can output an output voltage that is equal to the input voltage $V_{322}$ plus $2*V_H$. Similarly, by cascading N charge pumps together, the charge pump can output an output voltage that is equal to the input voltage $V_{322}$ plus $N*V_H$. The charge pump 214 shown in FIG. 2 can have the similar structure as the charge pump 212.

A gate capacitor $C_{216G}$ of the gate 216G (shown in FIG. 2) can be used as a charge reservoir for the charge pump 212. Furthermore, a gate voltage $V_{216G}$ at the gate 216G can be used as a bulk bias voltage of the switches 304 and 314, e.g., substrates of the switches 304 and 314 can be coupled to the gate voltage $V_{216G}$.

In one embodiment, a load of the charge pump 212 includes the gate capacitor $C_{216G}$ of the gate 216G and the pull-down resistor 220 shown in FIG. 2. A resistance of the pull-down resistor 220 can be relatively high, such that a current flowing through the resistor 220 and the charge pump 212 can be relatively small. As such, the power consumption generated by the load of the charge pump 212 can be neglected. The power consumption of the charge pump 212 can be caused by the switching loss of switches 302, 304, 312 and 314. In one embodiment, the switching loss of the charge pump 212 can be reduced as the frequency $f_{222}$ of the complementary clock signals 222_1 and 222_0 is decreased. Advantageously, the charge pump 212 can operate at a lower frequency after the switch (e.g., the charging switch 216, the discharging switch 218) is fully turned on, so as to reduce the power loss for the charge pump 212, in one embodiment.

Figure 4A:
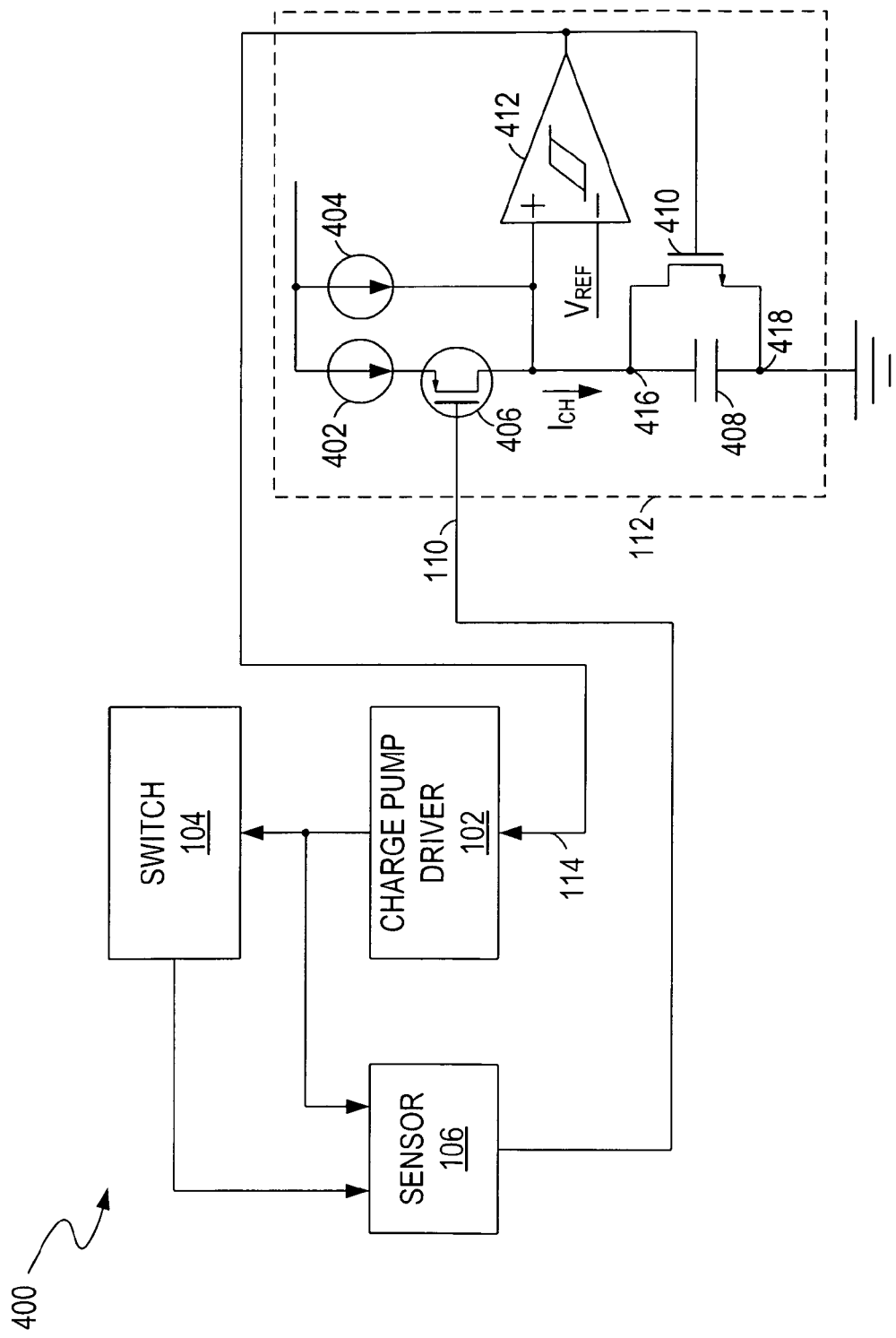
FIG. 4A depicts an exemplary circuit diagram of an electronic system with a clock generator, in accordance with one embodiment of the present invention.

FIG. 4A depicts an exemplary circuit diagram of an electronic system 400 with a clock generator 112, in accordance with one embodiment of the present invention. Elements that are labeled the same as in FIG. 1 have similar functions and will not be repetitively described herein.

As shown in FIG. 4A, the clock generator 112 includes a current controlled oscillator for generating the clock signal 114. More specifically, in one embodiment, the current controlled oscillator 112 includes a current source for generating a current $I_{CH}$ to charge a capacitor 408 and for adjusting the current $I_{CH}$ according to a status of a control switch 104 (or the charging switch 216, the discharging switch 218 shown in FIG. 2). For example, a first current source 404 can be coupled to a terminal 416 of the capacitor 408 and a second current source 402 can be coupled to the terminal 416 via a switch 406 (e.g., an NMOSFET, a PMOSFET). As such, when the switch 406 is on, the current $I_{CH}$ can be provided by both of the current sources 402 and 404, and can have a first level $I_{CH1}$. When the switch 406 is off, the current $I_{CH}$ can be provided by the current source 404 and can have a second level $I_{CH2}$ that is less than the first level $I_{CH1}$. In one embodiment, when the control switch 104 is not fully turned on, the control signal 110 of the sensor 106 can turn on the switch 406, such that the current $I_{CH}$ can have the first level $I_{CH1}$. When the control switch 104 is fully turned on, the control signal 110 of the sensor 106 can turn off the switch 406, such that the current $I_{CH}$ can have the second level $I_{CH2}$.

In one embodiment, the clock generator 112 further includes a comparator 412 coupled to the terminal 416 of the capacitor 408. The comparator 412 can compare a voltage $V_{416}$ at the terminal 416 with a reference voltage $V_{REF}$ and generate the clock signal 114 based on the comparison. Moreover, the clock generator 112 can include a discharging switch 410 coupled to the capacitor 408 and for discharging the capacitor 408 according to the clock signal 114.

For example, the discharging switch 410 is an NMOSFET having a drain coupled to the terminal 416 and a source coupled to another terminal 418 of the capacitor 408, e.g., coupled to ground. In addition, the comparator 412 can have a positive input terminal coupled to the voltage $V_{416}$, a negative input terminal coupled to the reference voltage $V_{REF}$, and an output terminal coupled to a gate of the NMOSFET 410 and for providing the clock signal 114. As such, when the voltage $V_{416}$ is less than the voltage $V_{REF}$, the switch 410 can be turned off by a low voltage signal 114. Meanwhile, the capacitor 408 can be charged by the charging current $I_{CH}$ so as to increase the voltage $V_{416}$. When the voltage $V_{416}$ is greater than the voltage $V_{REF}$, the comparator 412 can output a high voltage signal 114 to turn on the switch 410. Meanwhile, the capacitor 408 can be discharged by the switch 410, and the voltage $V_{416}$ will be decreased. As a result, the comparator 412 can generate the clock signal 114 by charging and discharging the capacitor 408 in an alternate fashion.

In one embodiment, the frequency $f_{114}$ of the clock signal 114 is determined by the charging current $I_{CH}$, e.g., is proportional to the charging current $I_{CH}$. As such, when the control switch 104 is not fully turned on, the charging current $I_{CH}$ can have a level of $I_{CH1}$ and the clock signal 114 can have a frequency value of $f_1$. When the control switch 104 is fully turned on, the charging current $I_{CH}$ can have a level of $I_{CH2}$ and the clock signal 114 can have a frequency value of $f_2$ that is less than $f_1$.

Figure 4B:
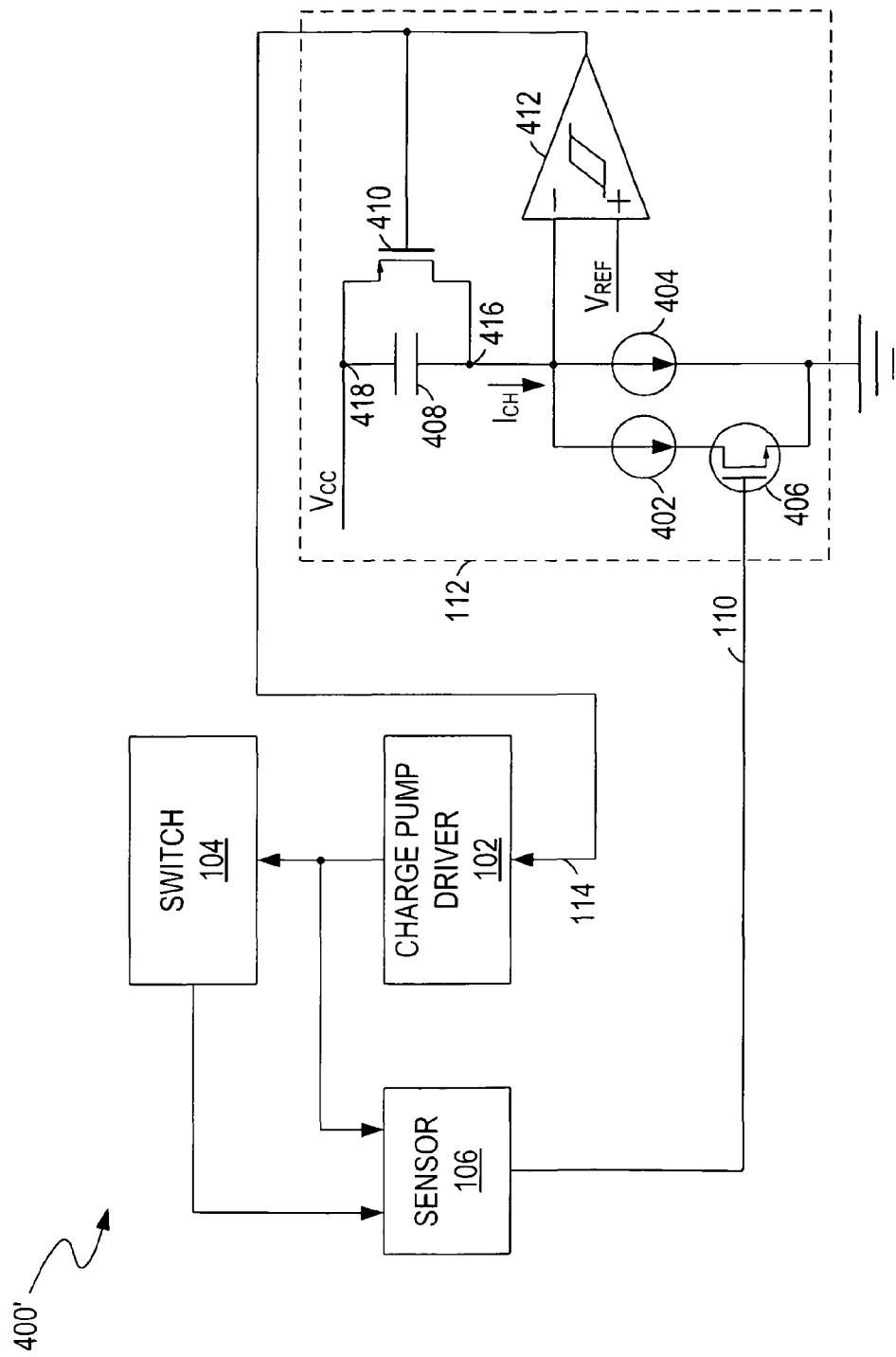
FIG. 4B depicts an exemplary circuit diagram of an electronic system with a clock generator, in accordance with one embodiment of the present invention.

FIG. 4B depicts another exemplary circuit diagram of an electronic system 400' with a clock generator 112, in accordance with one embodiment of the present invention. Elements that are labeled the same as in FIG. 1 and FIG. 4A have similar functions and will not be repetitively described herein.

As shown in FIG. 4B, the discharging switch 410 is a PMOSFET having a drain coupled to the terminal 416 of the capacitor 408 and a source coupled to the terminal 418 of the capacitor 408. In one such embodiment, the terminal 418 can be coupled to a supply voltage $V_{CC}$, the positive terminal of the comparator 412 can be coupled to the reference voltage $V_{REF}$, and the negative terminal of the comparator 412 can be coupled to the voltage $V_{416}$. Similar to the embodiment of FIG. 4A, the comparator 412 in FIG. 4B can generate the clock signal 114 based on the comparison between the voltages $V_{416}$ and $V_{REF}$.

Figure 5:
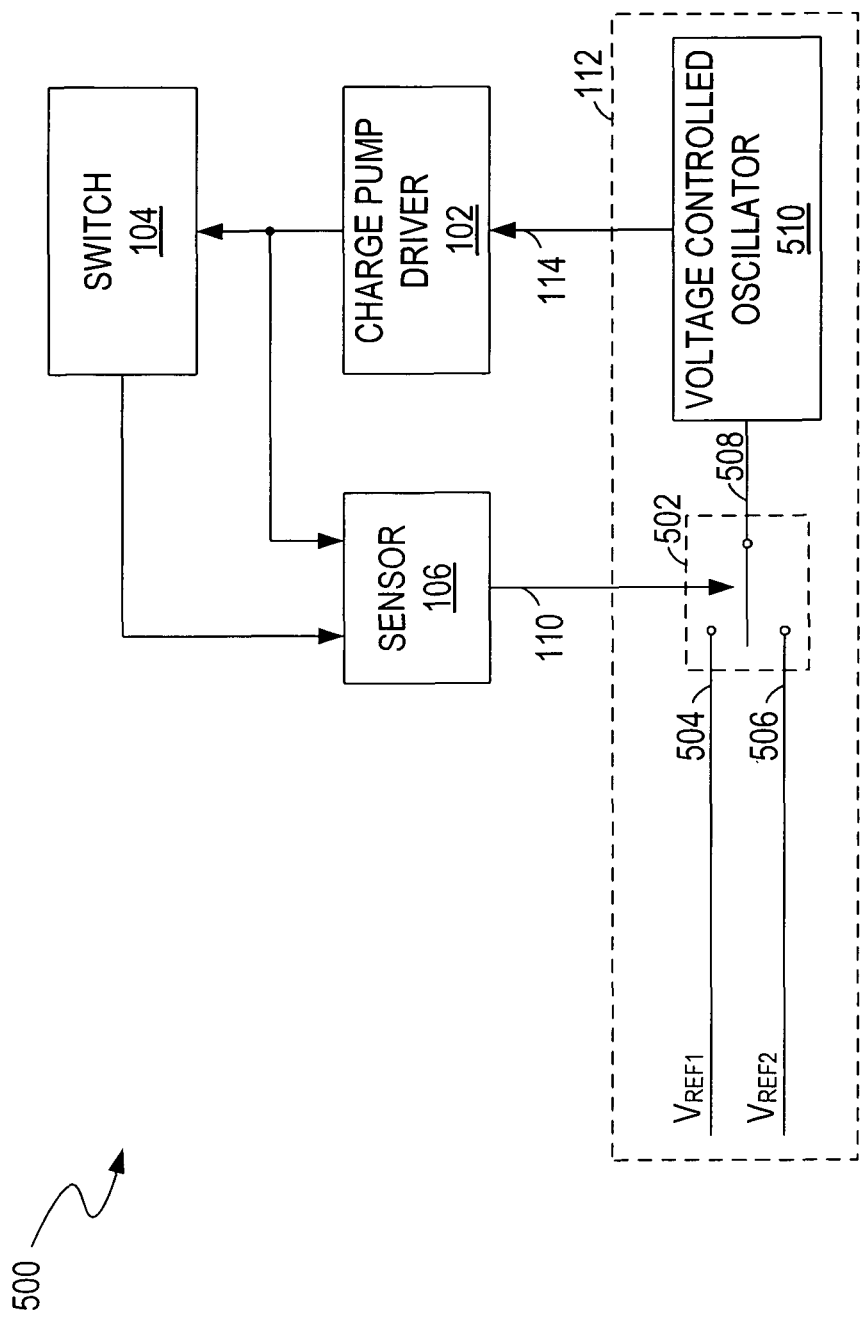
FIG. 5 depicts an exemplary circuit diagram of an electronic system with a clock generator, in accordance with one embodiment of the present invention.

FIG. 5 depicts another exemplary circuit diagram of an electronic system 500 with a clock generator 112, in accordance with one embodiment of the present invention. Elements that are labeled the same as in FIG. 1 have similar functions and will not be repetitively described herein.

In the example of FIG. 5, the clock generator 112 includes a voltage controlled oscillator 510 for generating the clock signal 114. The clock generator 112 can further include a multiplex switch 502. The multiplex switch 502 can have a first terminal 508 coupled to the voltage controlled oscillator 510, a second terminal 504 coupled to a first reference voltage $V_{REF1}$ and a third terminal 506 coupled to a second reference voltage $V_{REF2}$. In addition, the multiplex switch 502 can be controlled according to the status of the control switch 104, e.g., according to the gate-source voltage $V_{GS}$ of the control switch 104.

More specifically, the frequency $f_{114}$ of the clock signal 114 can be proportional to an input voltage, e.g., at the terminal 508, of the voltage controlled oscillator 510. The first reference voltage $V_{REF1}$ can be greater than the second reference voltage $V_{REF2}$. When the control switch 104 is not fully turned on, the control signal 110 of the sensor 106 can select the first reference voltage $V_{REF1}$ as the input voltage of the voltage controlled oscillator 510, e.g., couple the terminal 508 to the terminal 504. As such, the voltage controlled oscillator 510 can generate the clock signal 114 with a higher frequency having the first value $f_1$. When the control switch 104 is fully turned on, the control signal 110 can select the second reference voltage $V_{REF2}$ as the input voltage, e.g., couple the terminal 508 to the terminal 506. As such, the clock signal 114 can have a lower frequency having the second value $f_2$ that is less than $f_1$.

Figure 6:
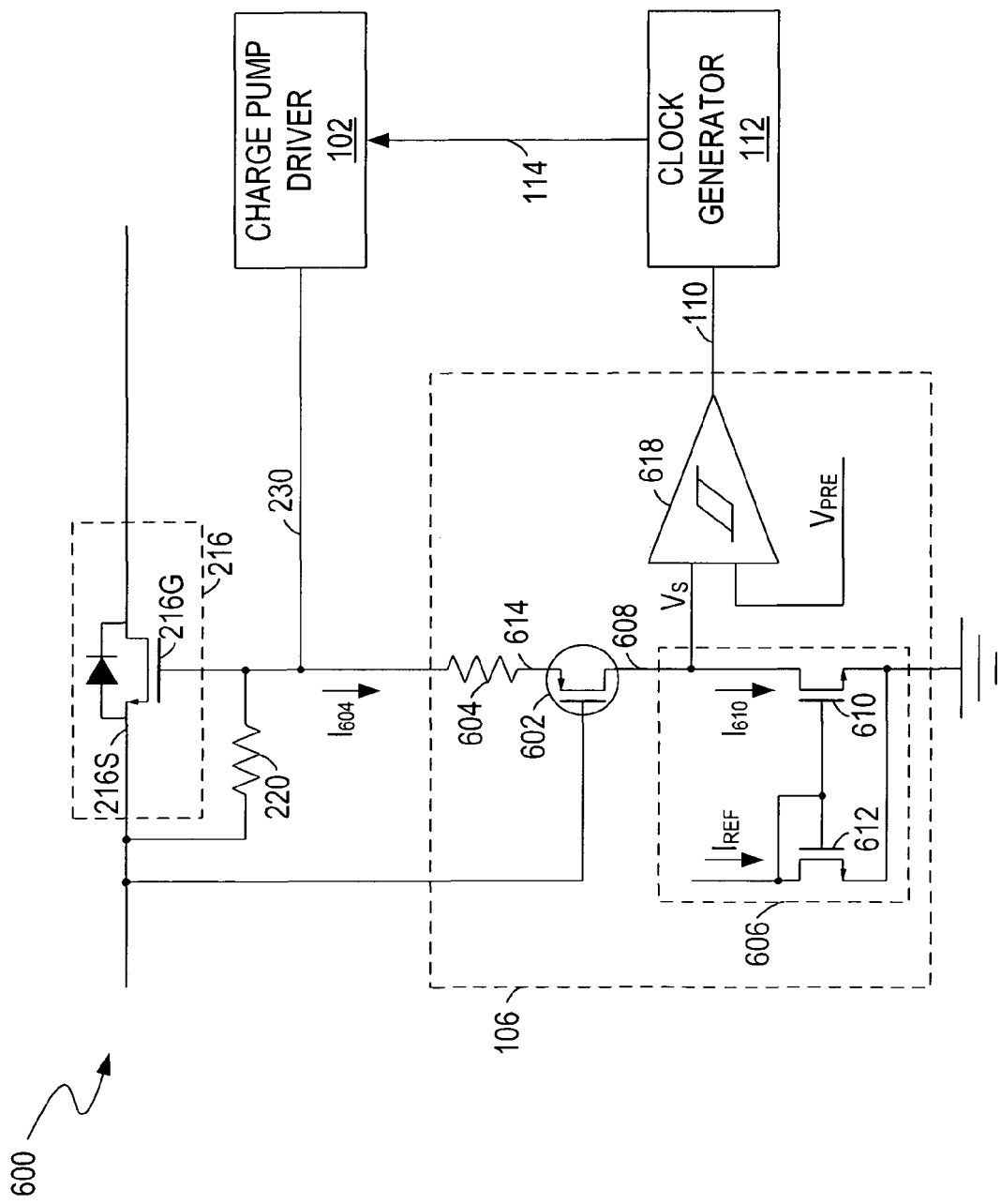
FIG. 6 depicts an exemplary circuit diagram of an electronic system with a sensor, in accordance with one embodiment of the present invention.

FIG. 6 depicts an exemplary circuit diagram of an electronic system 600 with a sensor 106, in accordance with one embodiment of the present invention. Elements that are labeled the same as in FIG. 1 and FIG. 2 have similar functions and will not be repetitively described herein.

In the example of FIG. 6, the sensor 106 includes a sensing switch 602 having a first terminal 614 coupled to the control switch 216 and a second terminal 608 coupled to ground via a bias circuit 606 for providing the sensing signal $V_S$. The sensing signal $V_S$ can have a voltage level proportional to the gate-source voltage $V_{GS}$ of the control switch 216. Furthermore, the sensor 106 can include a comparator 618 coupled to the clock generator 112. The comparator 618 can compare the sensing signal $V_S$ with a predetermined signal $V_{PRE}$, and generate the control signal 110 according to the comparison. In one embodiment, the predetermined signal $V_{PRE}$ is determined by the fully turn-on voltage $V_F$ of the control switch 216.

The sensing switch 602 can be a PMOSFET. The PMOSFET 602 can have a source, e.g., terminal 614, coupled to the gate 216G via a resistor 604, and a gate coupled to the source 216S and a drain, e.g., terminal 608, coupled to the bias circuit 606. As such, when the sensing switch 602 is cut off, a source-gate voltage $V_{602SG}$ of the sensing switch 602 can be equal to the gate-source voltage $V_{GS}$ of the control switch 216.

In one embodiment, a threshold voltage $V_T$ of the sensing switch 602 can be equal to the fully turn-on voltage $V_F$ of the control switch 216. As such, when the control switch 216 is not fully turned on (e.g., when $V_{GS}<V_F$, $V_{602SG}<V_T$), the sensing switch 602 can be turned off and the sensing signal $V_S$ at the terminal 608 can have a first voltage level $V_1$ that is lower than the predetermined signal level $V_{PRE}$. When the control switch 216 is fully turned on (e.g., when $V_{GS} \geq V_F$, $V_{602SG} \geq V_T$), the sensing switch 602 can be turned on, such that the sensing signal $V_S$ can be ramped up by the gate voltage $V_{216G}$ at the gate 216G and can have a second voltage level $V_2$ that is higher than the predetermined signal level $V_{PRE}$. As a result, the sensor 106 can generate the sensing signal $V_S$ indicative of the status of the control switch 216, and generate the control signal 110 to control the clock generator 112. In one embodiment, the bias circuit 606 includes a current source, e.g., a current mirror, that has a relatively high dynamic output resistance. In an alternate embodiment, the bias circuit 606 includes a resistor (not shown in FIG. 6) having a relatively high resistance.

In another embodiment, the threshold voltage $V_T$ of the sensing switch 602 is less than the fully turn-on voltage $V_F$ of the control switch 216. In one such embodiment, the sensing switch 602 can be turned on when the charge pump 212 is enabled. A current $I_{604}$ flowing through the resistor 604 can be given by $I_{604}=V_{GS}/(R_{604}+1/g_{602})$, where $R_{604}$ is a resistance of the resistor 604 and $g_{602}$ is a transconductance of the sensing switch 602. Thus, the current $I_{604}$ can be proportional to the gate-source voltage $V_{GS}$ of the control switch 216. As shown in FIG. 6, the current mirror 606 can provide two substantially identical currents, e.g., a reference current $I_{REF}$ and a mirror current $I_{610}$, when both MOSFETs 610 and 612 operate in the active (saturation) region. In one such embodiment, the level of the reference current $I_{REF}$ can be properly chosen according to the fully turn-on voltage $V_F$ of the control switch 216, such that the sense voltage $V_S$ can indicate the status of the control switch 216.

More specifically, when the control switch 216 is not fully turned on (e.g., when $V_{GS}<V_F$), the current $I_{604}$ can be less than the reference current $I_{REF}$. As such, the MOSFET 610 can drag the sense voltage $V_S$ down to a first voltage level $V'_1$, e.g., lower than the predetermined signal level $V_{PRE}$, so as to operate in the linear (ohmic) region and pass the current $I_{604}$ that is less than the reference current $I_{REF}$. When the control switch 216 is fully turned on (e.g., when $V_{GS} \geq V_F$), the current $I_{604}$ can be equal to the reference current $I_{REF}$. Meanwhile, the MOSFET 610 can operate in the active (saturation) region, and sense voltage $V_S$ can be at a second voltage level $V'_2$ that is higher than the predetermined signal level $V_{PRE}$.

Figure 7:
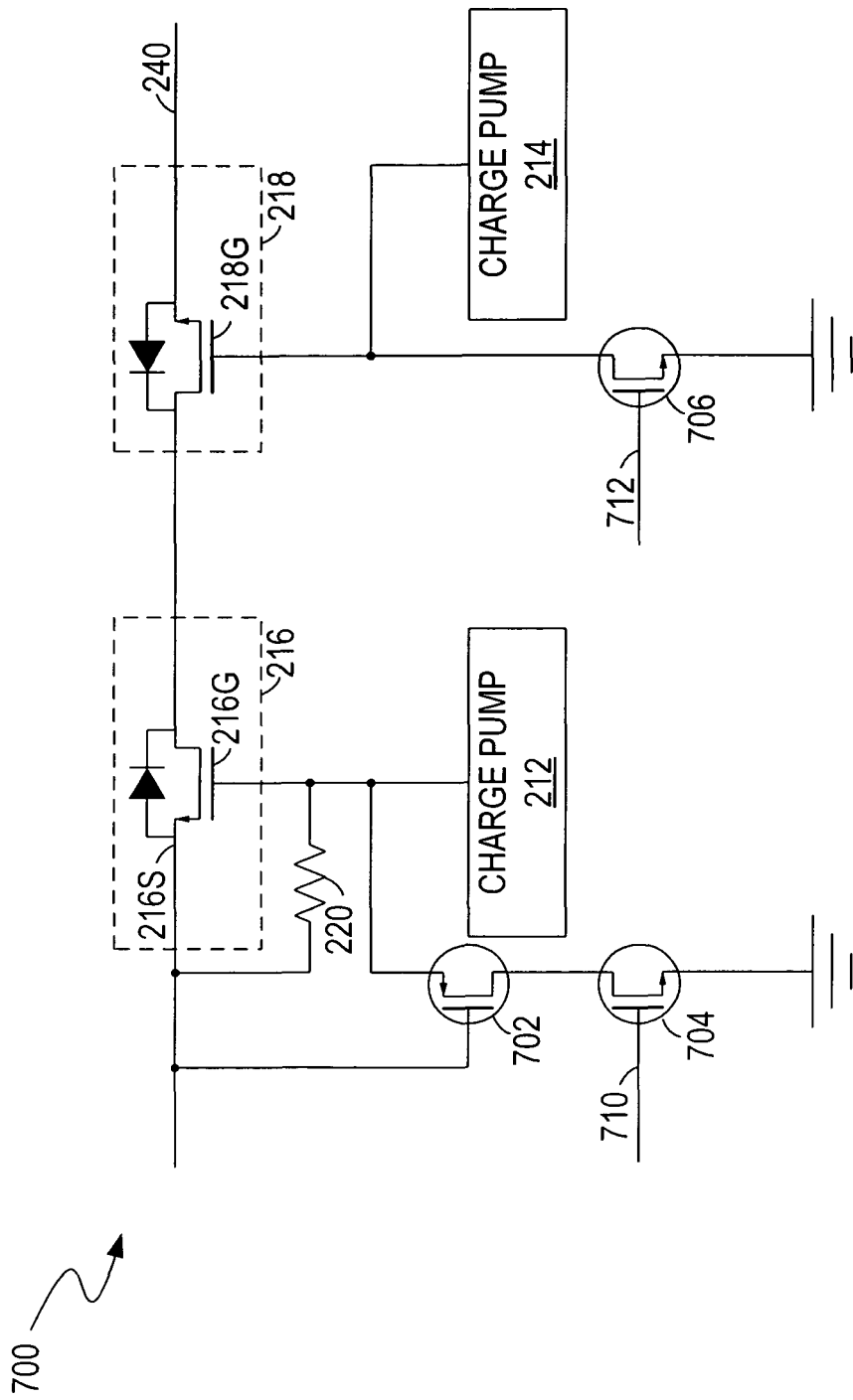
FIG. 7 depicts an exemplary circuit diagram of an electronic system with a discharge path, in accordance with one embodiment of the present invention.

FIG. 7 depicts an exemplary circuit diagram of an electronic system 700 with a discharge path, in accordance with one embodiment of the present invention. Elements that are labeled the same as in FIG. 2 have similar functions and will not be repetitively described herein. FIG. 7 is described in combination with FIG. 2.

In one embodiment, the electronic system 200 in FIG. 2 can further include a first discharge path for disabling the charging switch 216 and a second discharge path for disabling the discharging switch 218. For example, the first discharge path includes a first switch 702 coupled between a first terminal, e.g., gate 216G, of the charging switch 216 and a second terminal, e.g., source 216S, of the charging switch 216. The first switch 702 can also coupled to ground via a second switch 704 for disabling the charging switch 216. The second discharge path can include a third switch 706.

More specifically, the first switch 702 can be a PMOSFET having a source coupled to the gate 216G of the charging switch 216, a gate coupled to the source 216S of the charging switch 216, and a drain coupled to the second switch 704. In addition, the second switch 704 can be controlled by a control signal 710.

During battery charging/discharging, the charge pump 212 can be enabled, and a voltage on the pull-down resistor 220 can be greater than both the threshold voltages $V_{216T}$ of the charging switch 216 and $V_{702T}$ of the first switch 702. As such, both of the switches 216 and 702 can be turned on. Meanwhile, the control signal 710 can be disabled so as to turn off the second switch 704.

In one embodiment, when the battery charging/discharging operation is disabled/terminated, the charge pump 212 can be disabled and the control signal 710 can be enabled. As such, the second switch 704 can be turned on and the first discharging path can be conducted. At the moment, the gate voltage $V_{216G}$ at the gate 216G can decrease relatively quickly because a discharging current can flow through the first discharging path from the gate 216G to ground. In one embodiment, when the gate voltage $V_{216G}$ decreases to a first level and the gate-source voltage $V_{GS}$ of the charging switch 216 is less than the threshold voltage $V_{216T}$, the switch 216 can be turned off. Similarly, when the gate voltage $V_{216G}$ decreases to a second level and a source-gate voltage $V_{702SG}$ of the switch 702 is less than the threshold voltage $V_{702T}$, the switch 702 can be turned off. The first level can be equal to or different from the second level.

Consequently, in one embodiment, once the battery charging/discharging operation is disabled/terminated, the gate voltage $V_{216G}$ can decrease relatively quickly, such that the charging switch 216 can be turned off relatively quickly. In addition, the first discharging path can be cut off when the gate voltage $V_{216G}$ decreases to the second level, so as to avoid a current leakage flowing from the battery pack 242 (shown in FIG. 2) to ground.

The third switch 706 can be, but is not limit to, an NMOSFET or a PMOSFET, and can be controlled by a control signal 712. Similarly, during the battery charging/discharging, the charge pump 214 can be enabled, and the control signal 712 can be disabled so as to turn off the third switch 706. In one embodiment, once the battery charging/discharging operation is disabled/terminated, the charge pump 214 can be disabled and the control signal 712 can be enabled. As such, the switch 706 can be turned on so as to conduct the second discharging path. Consequently, a gate voltage $V_{218G}$ of the discharging switch 218 can drop down to zero relatively quickly, such that the discharging switch 218 can be turned off relatively quickly.

Figure 8:
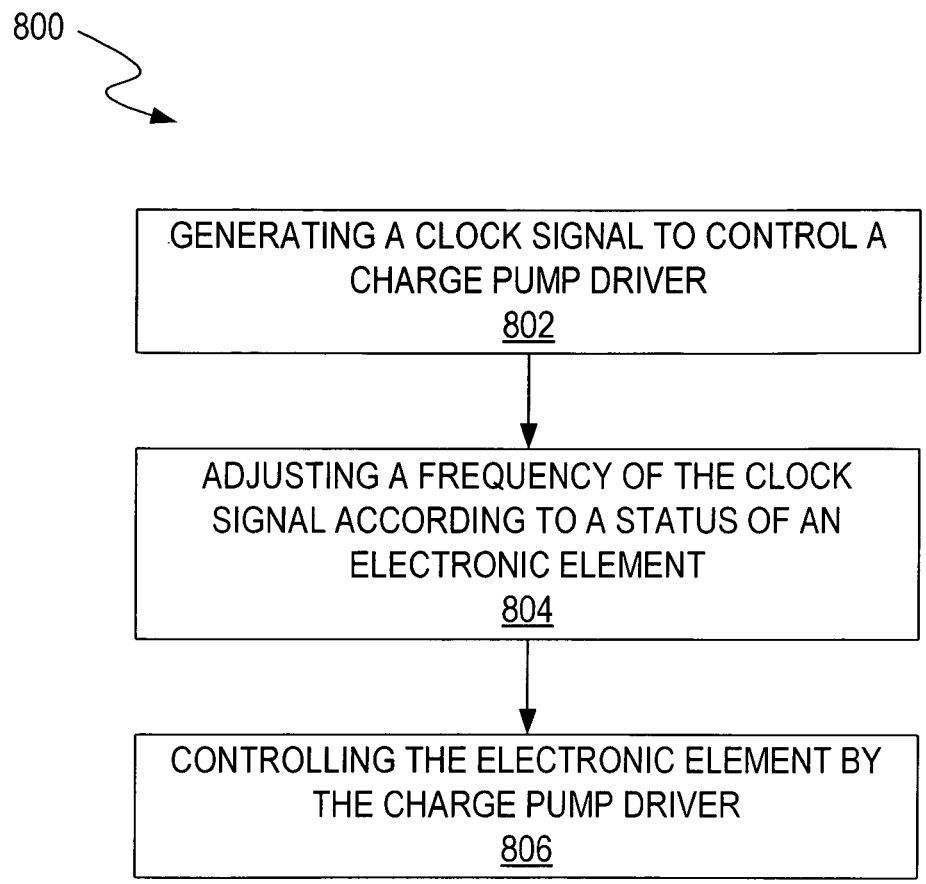
FIG. 8 depicts an exemplary flowchart of operations performed by an electronic system, in accordance with one embodiment of the present invention.

FIG. 8 depicts an exemplary flowchart 800 of operations performed by an electronic system, in accordance with one embodiment of the present invention. FIG. 8 is described in combination with FIG. 1, FIG. 2, FIG. 3, FIG. 4A, FIG. 4B, FIG. 5.

In block 802, the clock generator 112 can generate the clock signal 114 to control the charge pump driver 102. The clock signal 114 can be generated by a current controlled oscillator (e.g., in FIG. 4A, in FIG. 4B). The clock signal 114 can also be generated by a voltage controlled oscillator (e.g., in FIG. 5).

In block 804, the clock generator 112 can adjust the frequency $f_{114}$ of the clock signal 114 according to a status of the electronic element 104, e.g., a switch. As such, the charge pump driver 102 can control the electronic element 104 based on the clock signal 114, as described in block 806. More specifically, the sensor 106 can generate the control signal 110 indicative of the status of the switch 104, e.g., whether the switch 104 is fully turned on or not. The sensor 106 can further control the clock signal 114 according to the control signal 110. For example, the frequency $f_{114}$ can be adjusted to the first value $f_1$ (e.g., higher than 500 KHz) when the switch 104 is not fully turned on. In addition, the frequency $f_{114}$ can be adjusted to a second value $f_2$ that is less than the first value $f_1$ when the switch 104 is fully turned on.

Accordingly, the present invention provides an electronic system for controlling an electronic element, e.g., a switch, according to a status of the electronic element. The electronic system can operate at a higher frequency to turn on the switch relatively quickly when the switch is not fully turned on, and operate at a lower frequency when the switch is fully turned on. In one embodiment, the electronic system can be used in battery charging/discharging applications, battery management systems, etc. The electronic system can be implemented in many other applications, such as mobile phones, laptops, digital cameras, portable media players, personal digital assistant devices, etc.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. An electronic system comprising:
   a charge pump driver operable for generating an output to control a switch;
   a clock generator, coupled to said charge pump driver, operable for generating a clock signal to control said charge pump driver, operable for adjusting a frequency of said clock signal to a first value thereby increasing said output of said charge pump driver to turn on said switch, and operable for adjusting, in response to sensing that said output is greater than a predetermined voltage level, said frequency to a second value that is less than said first value and keeps said switch turned on; and
   a sensor, coupled to said switch and said charge pump driver, operable for sensing said output of said charge pump driver and a source voltage at a source terminal of said switch, generating a control signal indicative of a voltage difference between said output and said source voltage, and controlling said clock generator according to said control signal.

2. The electronic system as claimed in claim 1, wherein said voltage difference comprises a gate-source voltage of said switch, and wherein said charge pump driver increases said gate-source voltage of said switch by increasing said output of said charge pump driver.

3. The electronic system as claimed in claim 1, wherein said charge pump driver comprises:
   a first switch coupled between a terminal of a capacitor and an input terminal for charging said capacitor;
   a second switch coupled between said terminal of said capacitor and an output terminal for discharging said capacitor,
   wherein said output terminal provides said output of said charge pump driver, and wherein said first and second switches are controlled by said clock signal.

4. The electronic system as claimed in claim 1, wherein said clock generator comprises a current controlled oscillator for generating said clock signal.

5. The electronic system as claimed in claim 4, wherein said current controlled oscillator comprises:
   a current source for generating a current to charge a capacitor and for adjusting said current according to said output of said charge pump driver;
   a comparator coupled to a terminal of said capacitor and for comparing a voltage at said terminal of said capacitor with a reference voltage, and for generating said clock signal based on the comparison; and
   a discharging switch coupled to said capacitor and for discharging said capacitor according to said clock signal.

6. The electronic system as claimed in claim 1, wherein said clock generator comprises a voltage controlled oscillator for generating said clock signal.

7. The electronic system as claimed in claim 6, wherein said clock generator further comprises a multiplex switch having a first terminal coupled to said voltage controlled oscillator, a second terminal coupled to a first reference voltage and a third terminal coupled to a second reference voltage, and wherein said multiplex switch is controlled according to a status of said switch controlled by said output.

8. The electronic system as claimed in claim 1, wherein said switch is fully turned on if said output is greater than said predetermined voltage level.

9. The electronic system as claimed in claim 1, wherein said clock generator is operable for adjusting said frequency to said second value to maintain said output of said charge pump driver to be greater than said predetermined voltage level.

10. A method comprising:
    generating a clock signal to control a charge pump driver to generate an output to control a switch;
    sensing said output of said charge pump driver and a source voltage at a source terminal of said switch;
    generating a control signal indicative of a voltage difference between said output and said source voltage; and
    controlling said clock signal according said control signal, wherein said controlling comprises:
    adjusting a frequency of said clock signal to a first value thereby increasing said output of said charge pump driver to turn on a switch; and
    adjusting, in response to sensing that said output is greater than a predetermined voltage level, said frequency to a second value that is less than said first value but is high enough to keep said switch turned on.

11. The method as claimed in claim 10, further comprising:
    generating said clock signal by a voltage controlled oscillator.

12. The method as claimed in claim 10, further comprising:
    generating said clock signal by a current controlled oscillator.

13. The method as claimed in claim 10, further comprising:
    maintaining said output of said charge pump driver to be greater than said predetermined voltage level by adjusting said frequency to said second value.

14. An electronic system comprising:
a charge pump driver operable for generating an output to control a control switch;
a clock generator, coupled to said charge pump driver, operable for generating a clock signal to control said charge pump driver; and
a sensor, coupled to said charge pump driver and said clock generator, operable for sensing said output of said charge pump driver, controlling said clock generator to adjust a frequency of said clock signal to a first value thereby increasing said output of said charge pump driver to turn on said control switch, and controlling, in response to sensing that said output is greater than a predetermined voltage level, said clock generator to adjust said frequency to a second value that is less than said first value and keeps said control switch turned on, wherein said sensor comprises:
a sensing switch having a source terminal coupled to a gate terminal of
said control switch and a gate terminal coupled to a source terminal of said control switch, and operable for delivering a sense current indicative of a gate-source voltage of said control switch; and
a current mirror, coupled to said sensing switch, operable for receiving said sense current and a reference current,
wherein said current mirror provides a sense signal at a first voltage level if said sense current is less than said reference current, and wherein said current mirror controls said sense signal to a second voltage level if said sense current is equal to said reference current.

15. The electronic system as claimed in claim 14, wherein said control switch controls charging and discharging of a battery pack according to said output of said charge pump driver.

16. The electronic system as claimed in claim 14, wherein said charge pump driver comprises:
a first switch coupled between a terminal of a capacitor and an input terminal for charging said capacitor;
a second switch coupled between said terminal of said capacitor and an output terminal for discharging said capacitor,
wherein said output terminal provides said output of said charge pump driver, and wherein said first and second switches are controlled by said clock signal.

17. The electronic system as claimed in claim 14, wherein said clock generator comprises a current controlled oscillator for generating said clock signal.

18. The electronic system as claimed in claim 17, wherein said current controlled oscillator comprises:
a current source for generating a current to charge a capacitor and for adjusting said current according to said output of said charge pump driver;
a comparator coupled to a terminal of said capacitor and for comparing a voltage at said terminal of said capacitor with a reference voltage, and for generating said clock signal based on the comparison; and
a discharging switch coupled to said capacitor and for discharging said capacitor according to said clock signal.

19. The electronic system as claimed in claim 14, wherein said clock generator comprises a voltage controlled oscillator for generating said clock signal.

20. The electronic system as claimed in claim 19, wherein said clock generator further comprises a multiplex switch having a first terminal coupled to said voltage controlled oscillator, a second terminal coupled to a first reference voltage and a third terminal coupled to a second reference voltage, and wherein said multiplex switch is controlled by a status of said control switch.

21. The electronic system as claimed in claim 14, wherein said electronic system further comprises a first switch coupled between a first terminal of said control switch and a second terminal of said control switch, and coupled to ground via a second switch for disabling said control switch.

22. The electronic system as claimed in claim 14, wherein said clock generator is operable for adjusting said frequency to said second value to maintain said output of said charge pump driver to be greater than said predetermined voltage level.

* * * * *